US011244154B2

(12) United States Patent
Zhao et al.

(10) Patent No.: US 11,244,154 B2
(45) Date of Patent: Feb. 8, 2022

(54) TARGET HAND TRACKING METHOD AND APPARATUS, ELECTRONIC DEVICE, AND STORAGE MEDIUM

(71) Applicant: SENSETIME INTERNATIONAL PTE. LTD., Singapore (SG)

(72) Inventors: Haiyu Zhao, Singapore (SG); Mingyuan Zhang, Singapore (SG); Kaige Chen, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/900,324

(22) Filed: Jun. 12, 2020

(65) Prior Publication Data

US 2021/0192197 A1 Jun. 24, 2021

Related U.S. Application Data

(63) Continuation of application No. PCT/IB2020/052494, filed on Mar. 19, 2020.

(30) Foreign Application Priority Data

Dec. 23, 2019 (SG) .............................. 10201913029S

(51) Int. Cl.
G06K 9/00 (2006.01)
G06K 9/20 (2006.01)
(52) U.S. Cl.
CPC ....... *G06K 9/00355* (2013.01); *G06K 9/2054* (2013.01)

(58) Field of Classification Search
CPC .................. G06K 9/00355; G06K 9/2054
See application file for complete search history.

(56) References Cited

U.S. PATENT DOCUMENTS

| 10,229,313 B1* | 3/2019 | Gribetz ................... G06F 3/017 |
| 10,296,102 B1* | 5/2019 | Misra ................... G06K 9/2054 |
| 11,055,585 B2* | 7/2021 | Amato ............... G06K 9/00771 |

(Continued)

FOREIGN PATENT DOCUMENTS

| CN | 108682021 A | 10/2018 |
| CN | 109190559 A | 1/2019 |

(Continued)

OTHER PUBLICATIONS

Search Report and Written Opinion for Singapore Application No. 10201913029S, dated Feb. 6, 2020, 11 pages.

(Continued)

*Primary Examiner* — Ming Y Hon

(57) ABSTRACT

Disclosed are a target tracking method and apparatus, an electronic device, and a storage medium. The method includes: detecting a to-be-processed image to obtain a hand detection result; in response to the hand detection result including a bounding box of hand, determining a hand in the bounding box with a hand pose conforming to a hand pose in a target gesture as a target hand; and tracking the target hand in a video stream according to the target hand in the to-be-processed image, where images in the video stream and the to-be-processed image are obtained by capturing a same target area, and the images in the video stream are captured after the to-be-processed image is captured.

18 Claims, 4 Drawing Sheets

(56) References Cited

U.S. PATENT DOCUMENTS

| | | | |
|---|---|---|---|
| 2007/0110298 A1* | 5/2007 | Graepel | H04N 13/239 |
| | | | 382/154 |
| 2013/0144629 A1* | 6/2013 | Johnston | G06F 3/017 |
| | | | 704/275 |
| 2014/0361985 A1 | 12/2014 | Arai | |
| 2015/0253864 A1 | 9/2015 | Parkhomenko et al. | |
| 2016/0124513 A1* | 5/2016 | Dal Zot | G06K 9/00355 |
| | | | 715/863 |
| 2016/0335837 A1 | 11/2016 | Shigeta | |
| 2017/0192515 A1 | 7/2017 | Menadeva et al. | |
| 2018/0314911 A1* | 11/2018 | Eldar | G06T 7/11 |
| 2019/0073565 A1* | 3/2019 | Saliou | G06K 9/00744 |
| 2019/0130191 A1* | 5/2019 | Zhou | G06K 9/4604 |
| 2019/0138676 A1* | 5/2019 | Akella | G06K 9/3233 |
| 2019/0163965 A1* | 5/2019 | Yoo | G06K 9/629 |
| 2020/0133644 A1* | 4/2020 | Hou | G06F 40/14 |
| 2020/0272813 A1* | 8/2020 | Hebbalaguppe | G06K 9/2054 |
| 2020/0409469 A1* | 12/2020 | Kannan | G06F 3/167 |

FOREIGN PATENT DOCUMENTS

| | | |
|---|---|---|
| CN | 110163068 A | 8/2019 |
| CN | 110276292 A | 9/2019 |

OTHER PUBLICATIONS

Mantecon et al., "A real-time gesture recognition system using near-infrared imagery", Plos One, vol. 14, No. 10, Oct. 3, 2019, 17 pages.

Ray et al., "An Efficient Approach for Object Detection and Tracking of Objects in a Video with Variable Background", May 11, 2017, 11 pages.

Ghobadi. "Real Time Object Recognition and Tracking Using 2D/3D Images", Sep. 16, 2010, 141 pages.

Feng et al., "Can We Trust You? On Calibration of a Probabilistic Object Detector for Autonomous Driving", Sep. 26, 2019, 6 pages.

Bazarevsky V. et al., "On-Device, Real-Time Hand Tracking with MediaPipe", GoogleAl Blog, Aug. 19, 2019, 5 pages.

International Search Report and Written Opinion for International Application No. PCT/IB2020/052494, dated Jul. 24, 2020, 10 pages.

Search Report and Written Opinion for Singapore Application No. 10201913029S, dated Jul. 24, 2020, 8 pages.

Macao Intellectual Property Office, Disagreement Issued in Application No. I/1672, Nov. 26, 2021, 35 pages. (Submitted with Machine Translation).

* cited by examiner

TARGET HAND TRACKING METHOD AND APPARATUS, ELECTRONIC DEVICE, AND STORAGE MEDIUM

CROSS-REFERENCE TO RELATED APPLICATION

The present application is a continuation of International Application No. PCT/IB2020/052494, filed on Mar. 19, 2020, which claims a priority of the Singaporean patent application No. 10201913029S, filed on Dec. 23, 2019, all of which are incorporated herein by reference in their entirety.

TECHNICAL FIELD

The present disclosure relates to computer vision technologies, and in particular, to a target tracking method and apparatus, an electronic device, and a storage medium.

BACKGROUND

In recent years, with continuous development of an artificial intelligence technology, the artificial intelligence technology achieves good effects in aspects such as computer vision and speech recognition. When target recognition and tracking are performed in some relatively special scenes (such as a tabletop game scene), it would be easy to cause misjudgment during recognition on a single frame of picture, while too large deep learning model during recognition on multiple frames of videos would cause high system time consumption.

SUMMARY

The present disclosure provides solutions for target tracking.

According to one aspect of the present disclosure, provided is a target tracking method. The method includes: detecting a to-be-processed image to obtain a hand detection result; in response to the hand detection result including a bounding box of hand, determining a hand in the bounding box with a hand pose conforming to a hand pose in a target gesture as a target hand; and tracking the target hand in a video stream according to the target hand in the to-be-processed image, where images in the video stream and the to-be-processed image are obtained by capturing a same target area, and the images in the video stream are captured after the to-be-processed image is captured.

According to any one of implementations provided by the present disclosure, in response to the hand detection result including the bounding box of hand, determining the hand in the bounding box with the hand pose conforming to the hand pose in the target gesture as the target hand includes: in response to the hand detection result including the bounding box, determining the hand in the bounding box, with the hand pose conforming to the hand pose in the target gesture and in a pre-defined area of the to-be-processed image, as the target hand.

According to any one of implementations provided by the present disclosure, determining that the hand pose in the bounding box conforms to the hand pose in the target gesture includes: in response to the hand detection result including the bounding box of hand, cropping an image located in the bounding box in the to-be-processed image; and determining, according to the cropped image, that a hand pose in the cropped image conforms to the hand pose in the target gesture.

According to any one of implementations provided by the present disclosure, the hand pose in the target gesture is that two hands both face up; determining that the hand pose in the bounding box conforms to the hand pose in the target gesture includes: inputting an image in the bounding box to a gesture classification neural network to obtain a hand gesture classification result, the hand gesture classification result including a hand facing up or the hand with other poses; and if hand gesture classification results of two bounding boxes of hand are that two hands both face up, determining that the hand poses in the bounding boxes of hand conform to the hand pose in the target gesture.

According to any one of implementations provided by the present disclosure, the gesture classification neural network is obtained by training with hand image samples, the hand image samples including an image sample with a hand facing up, and an annotation result of the image sample with the hand facing up being a center of the palm of the hand.

According to any one of implementations provided by the present disclosure, determining that the hand in the bounding box is located in the pre-defined area in the to-be-processed image includes: in response to determining that a center point of the bounding box is located in the pre-defined area of the to-be-processed image, determining that the hand in the bounding box is located in the pre-defined area of the to-be-processed image.

According to any one of implementations provided by the present disclosure, the pre-defined area includes two set sub-areas corresponding to two sub-areas in the target area respectively in the to-be-processed image; determining that the center point of the bounding box is located in the pre-defined area of the to-be-processed image includes: determining that center points of two bounding boxes in the to-be-processed image are located in the two set sub-areas respectively.

According to any one of implementations provided by the present disclosure, tracking the target hand in the video stream according to the target hand in the to-be-processed image includes: for one of image frames in the video stream, determining a first matrix and a second matrix of the image frame according to a first matrix and a second matrix of a previous image frame immediately next to the image frame, where the first matrix of the image frame includes position information of the center of the bounding box of the target hand in the image frame, and the second matrix of the image frame is a covariance matrix of the first matrix of the image frame.

According to any one of implementations provided by the present disclosure, determining the first matrix and the second matrix of the image frame according to the first matrix and the second matrix of the previous image frame immediately next to the image frame includes: in response to a hand detection result of the image frame not including the bounding box of the target hand, determining the first matrix of the previous image frame as the first matrix of the image frame, and correcting the second matrix of the previous image frame with a correction matrix to obtain the second matrix of the image frame, where the correction matrix is a covariance matrix of the second matrix of the previous image frame.

According to any one of implementations provided by the present disclosure, determining the first matrix and the second matrix of the image frame according to the first matrix and the second matrix of the previous image frame immediately next to the image frame includes: in response to the hand detection result of the image frame including the bounding box of the target hand, predicting a first prediction matrix and a second prediction matrix of the image frame with the first matrix of the previous image frame according to a time interval between the image frame and the previous image frame, where the second prediction matrix is a covariance matrix of the first prediction matrix; obtaining a third prediction matrix and a fourth prediction matrix of the image frame according to the position information of the bounding box of the target hand, where the third prediction matrix includes predicted position information of the center of the bounding box of the target hand in the image frame, and the fourth prediction matrix is a covariance matrix of the third prediction matrix; and multiplying a Gaussian distribution corresponding to the second prediction matrix by a Gaussian distribution corresponding to the fourth prediction matrix to obtain a new Gaussian distribution; determining the first matrix of the image frame according to an average value of the obtained new Gaussian distribution; and determining the second matrix of the image frame according to covariance of the obtained new Gaussian distribution.

According to any one of implementations provided by the present disclosure, the to-be-processed image is an image of the target area captured at an overhead view.

According to one aspect of the present disclosure, provided is a target tracking apparatus. The apparatus includes: a detecting unit, configured to detect a to-be-processed image to obtain a hand detection result; a determining unit, configured to: in response to the hand detection result including a bounding box, determine a hand in the bounding box with a hand pose conforming to a hand pose in a target gesture as a target hand; and a tracking unit, configured to track the target hand in a video stream according to the target hand in the to-be-processed image, where images in the video stream and the to-be-processed image are obtained by capturing a same target area, and the images in the video stream are captured after the to-be-processed image is captured.

According to any one of implementations provided by the present disclosure, the determining unit is configured to: in response to the hand detection result including the bounding box, determine a hand in the bounding box, with the hand pose conforming to the hand pose in the target gesture and in a pre-defined area of the to-be-processed image, as the target hand.

According to any one of implementations provided by the present disclosure, the determining unit is configured to: in response to the hand detection result including the bounding box, crop an image located in the bounding box in the to-be-processed image; and determine, according to the cropped image, that a hand pose in the cropped image conforms to the hand pose in the target gesture.

According to any one of implementations provided by the present disclosure, the hand pose in the target gesture is that two hands both face up; the determining unit is configured to: input an image in the bounding box to a gesture classification neural network to obtain a hand gesture classification result, the hand gesture classification result including a hand facing up or the hand with other poses; and if hand gesture classification results of two bounding boxes of hand are that two hands both face up, determine that the hand poses in the bounding boxes of hand conform to the hand pose in the target gesture.

According to any one of implementations provided by the present disclosure, the gesture classification neural network is obtained by training with hand image samples, the hand image samples including an image sample with a hand facing up, and an annotation result of the image sample with the hand facing up being a center of a palm of the hand.

According to any one of implementations provided by the present disclosure, the determining unit is configured to: in response to determining that a center point of the bounding box is located in the pre-defined area of the to-be-processed image, determine that the hand in the bounding box is located in the pre-defined area of the to-be-processed image.

According to any one of implementations provided by the present disclosure, the pre-defined area includes two set sub-areas corresponding to two sub-areas in the target area respectively in the to-be-processed image; the determining unit is configured to: determine that center points of two bounding boxes of hand in the to-be-processed image are located in the two set sub-areas respectively.

According to any one of implementations provided by the present disclosure, the tracking unit is configured to: for one of image frames in the video stream, determine a first matrix and a second matrix of the image frame according to a first matrix and a second matrix of a previous image frame immediately next to the image frame, where the first matrix of the image frame includes position information of the center of the bounding box of the target hand in the image frame, and the second matrix of the image frame is a covariance matrix of the first matrix of the image frame.

According to any one of implementations provided by the present disclosure, the tracking unit is configured to: in response to a hand detection result of the image frame not including the bounding box of the target hand, determine the first matrix of the previous image frame as the first matrix of the image frame, and correct the second matrix of the previous image frame with a correction matrix to obtain the second matrix of the image frame, where the correction matrix is a covariance matrix of the second matrix of the previous image frame.

According to any one of implementations provided by the present disclosure, the tracking unit is configured to: in response to the hand detection result of the image frame including the bounding box of the target hand, predict a first prediction matrix and a second prediction matrix of the image frame with the first matrix of the previous image frame according to a time interval between the image frame and the previous image frame, where the second prediction matrix is a covariance matrix of the first prediction matrix; obtain a third prediction matrix and a fourth prediction matrix of the image frame according to the position information of the bounding box of the target hand, where the third prediction matrix includes predicted position information of the center of the bounding box of the target hand in the image frame, and the fourth prediction matrix is a covariance matrix of the third prediction matrix; multiply a Gaussian distribution corresponding to the second prediction matrix by a Gaussian distribution corresponding to the fourth prediction matrix to obtain a new Gaussian distribution; determine the first matrix of the image frame according to an average value of the obtained new Gaussian distribution; and determine the second matrix of the image frame according to covariance of the obtained new Gaussian distribution.

According to any one of implementations provided by the present disclosure, the to-be-processed image is an image of the target area captured at an overhead view.

According to one aspect of the present disclosure, provided is an electronic device, including a memory and a processor, where the memory is configured to store computer instruction runnable on the processor, and the processor is configured to implement the target tracking method according to any one of implementations of the present disclosure when executing the computer instructions.

According to one aspect of the present disclosure, provided is a computer-readable storage medium, having a computer program stored thereon, where when the program is executed by a processor, the target tracking method according to any one of the implementations of the present disclosure is implemented.

In the target tracking method and apparatus, electronic device, and storage medium according to one or more embodiments of the present disclosure, by detecting a hand pose in a bounding box in a hand detection result to determine a target hand that conforms to a hand pose in a target gesture, i.e., recognizing a target hand to be tracked from a to-be-processed image, and tracking the target hand in a synchronously captured video stream, the target hand can be recognized quickly and effectively according to the target gesture, thereby improving tracking efficiency.

BRIEF DESCRIPTION OF THE DRAWINGS

To describe the technical solutions in one or more embodiments of the description or the prior art more clearly, the accompanying drawings required for describing the embodiments or the prior art are briefly introduced below. Apparently, the accompanying drawings in the following description show merely some embodiments described in the one or more embodiments of the description, and a person of ordinary skill in the art can still derive other accompanying drawings from these accompanying drawings without involving an inventive effort.

DETAILED DESCRIPTION OF THE EMBODIMENTS

To make a person skilled in the art better understand the technical solutions in one or more embodiments of the description, the technical solutions in the one more embodiments of the description are clearly and fully described below with reference to the accompanying drawings in the one or more embodiments of the description. Apparently, the described embodiments are merely some of the embodiments of the description, but not all the embodiments. Based on the one or more embodiments of the description, all other embodiments obtained by a person of ordinary skill in the art without involving an inventive effort shall fall within the scope of protection of the present disclosure.

At least one embodiment of the present disclosure provides a target tracking method. The target tracking method may be executed by an electronic device such as a terminal device or a server. The terminal device may include a User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer-readable instructions stored in a memory.

Figure 1:
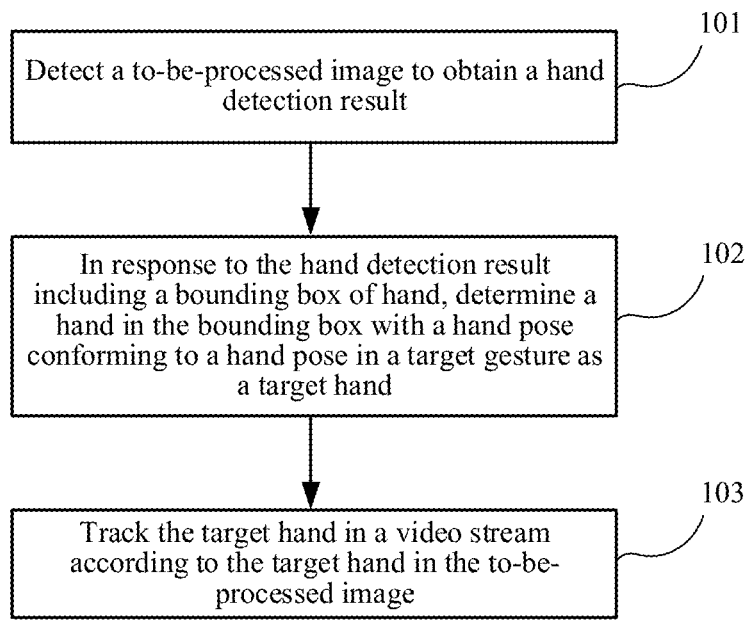
FIG. 1 is a flowchart of a target tracking method provided by at least one embodiment of the present disclosure.

FIG. 1 shows a flowchart of the target tracking method. As shown in FIG. 1, the method may include steps 101-103.

In step 101, a to-be-processed image is detected to obtain a hand detection result.

In the embodiments of the present disclosure, the to-be-processed image may be an image of a tabletop area captured by an image capture device (for example, a camera). The image may include a complete tabletop image or may include a part of an image of a tabletop.

The image captured by the image capture device may be a frame in a video stream or may be an image acquired in real time, and no limitation is made thereto in the present disclosure.

In the embodiments of the present disclosure, a hand in the image may be detected via a deep learning network, for example, faster RCNN network, so as to obtain a hand detection result. A person skilled in the art should understand that the faster RCNN network is only an example, and other networks may also be used. No limitation is made thereto in the present disclosure.

In some embodiments, the to-be-processed image may be captured at an overhead view, e.g., the to-be-processed image is captured by a birdview camera. For an application scene, e.g., the tabletop game scene, the top view is a good photography view, and the top view can avoid blocking a detection target caused by other objects. However, a person skilled in the art should understand that the to-be-processed image captured by the image capture device at other views, such as left view or right view, may also be applied to the target tracking method provided in the embodiments of the present disclosure.

In step 102, in response to the hand detection result including a bounding box of hand, a hand in the bounding box with a hand pose conforming to a hand pose in a target gesture is determined as a target hand.

In the embodiments of the present disclosure, the image in the bounding box is detected, and a detected feature is compared with a feature of the hand pose in the target gesture to determine whether the hand pose in the bounding box conforms to the hand pose in the target gesture; or hand poses in the bounding boxes are classified, and it is determined whether the hand poses in the bounding boxes conform to the hand pose in the target gesture by a classification result. The specific determining method would be described in detail below.

In response to the hand detection result including one or more bounding boxes of hand, the bounding boxes, in which the hand poses conform to the hand pose in the target gesture, may be determined as the target bounding boxes, and the hands in the target bounding boxes are determined as target hands.

In step 103, the target hand is tracked in a video stream according to the target hand in the to-be-processed image.

Images in the video stream and the to-be-processed image are obtained by capturing a same target area, and the image in the video stream is captured after the to-be-processed image is captured.

In some embodiments, the to-be-processed image and the image in the video stream may be synchronously captured.

In some embodiments, the to-be-processed image is an image of the target area captured at an overhead view, and the images in the video stream may be images of the target area captured at an overhead view or images of the target area captured at other views, for example, at a side view.

In response to determining the target hand from the to-be-processed image, the target hand is tracked from the synchronously captured video stream.

For the target hand in the to-be-processed image, a hand associated with the target hand is determined from the images in the video stream, and the hand is determined as a target hand in the video stream for tracking. An association relationship between the hand in the to-be-processed image and the hand in the images in the video stream may be determined by using various ways, and no limitation is made thereto in the present disclosure.

In embodiments of the present disclosure, by detecting a hand pose in a bounding box in a hand detection result to determine a target hand that conforms to a hand pose in a target gesture, i.e., recognizing a target hand to be tracked from a to-be-processed image, and tracking the target hand in a synchronously captured video stream, the target hand can be recognized quickly and effectively according to the target gesture, thereby improving tracking efficiency.

In some embodiments, a center point of the bounding box may be determined as the position of the hand. A person skilled in the art should understand that other position points of the bounding box may also be determined as the position of the hand, for example, when a target gesture to be recognized has a closest relationship with one of fingers, the position of the finger in the bounding box may be determined as the position of the hand. The specific mode of determining the position of the hand may be determined according to the relationship between the target gesture to be recognized and the bounding box.

In some embodiments, in response to the hand detection result including a bounding box of hand, a hand in the bounding box, with the hand pose conforming to the hand pose in the target gesture and in a pre-defined area of the to-be-processed image, is determined as the target hand.

In the embodiments of the present disclosure, in a case that the hand detection result includes a bounding box of hand, the hand detection result also includes position information of the bounding box and thus position information of the hand in the to-be-processed image is determined. For example, the center point position of the bounding box may be taken as the position of the hand. In a case that the hand pose in the bounding box conforms to the hand pose in the target gesture, the hand in the bounding box, where the center point of the bounding box is located in the pre-defined area of the to-be-processed image, may be taken as the target hand.

In an example, the pre-defined area in the to-be-processed image includes two set sub-areas corresponding to two sub-areas in the target area respectively in the to-be-processed image. For example, in a case that the target area is a game table, the pre-defined area includes two set sub-areas corresponding to two sub-areas on the game table.

For a specific hand pose occurring in a specific area referred to as the target gesture, a position constraint is provided for the hand in the bounding box by using the pre-defined area in the to-be-processed image, to more accurately determine whether the detected hand pose is the target gesture. The pre-defined area in the to-be-processed image may be determined according to the position and intrinsic parameters of the image capture device for capturing the to-be-processed image, and the specific area corresponding to the target gesture in an actual space.

In some embodiments, determining whether the hand pose in the bounding box conforms to the hand pose in the target gesture includes: inputting the image in the bounding box to a pre-trained gesture classification neural network to obtain a hand gesture classification result, and determining whether the hand pose in the bounding box conforms to the hand pose in the target gesture with the classification result.

The gesture classification neural network may be a convolutional classification model, for example, Rsenet 18 is used as a convolutional classification model of a backbone network. A person skilled in the art should understand that the gesture classification neural network may be determined according to a classification type to be obtained; the classification type to be obtained may be determined according to a target gesture to be recognized. No limitation is made thereto in the present disclosure.

In an example, when the target gesture to be recognized relates only to a hand facing up, the classification type to be obtained may include the hand facing up or the hand with other poses, where the other poses include hand poses other than the hand facing up and the hand being blocked. The gesture classification neural network may be trained with an image sample including the hand facing up, and an annotation result of the image sample with the hand facing up is a center of the palm of the hand. The hand facing up refers to a palm of the hand facing up and that a center of the palm can be seen in the to-be-processed image (that is, the center of the palm is not blocked). The hand being blocked refers to a center of a palm of the hand being blocked. In embodiments of the present disclosure, the terms "up" and "down" are relative to the ground. For a hand, if a palm of the hand is closer to the ground than a back of the hand, the hand faces down. If the back of the hand is closer to the ground than the palm of the hand, the hand faces up.

In an example, when the target gesture to be recognized relates to the hand facing up and the hand facing down, the classification type to be obtained may include the hand facing up, the hand facing down, and the hand with other poses, where the other poses include hand poses other than the hand facing up and the hand facing down, and the hand being blocked. The hand facing down refers to a palm of hand facing down. The gesture classification neural network may be trained with the image sample including the hand facing up and an image sample including the hand facing down, where the annotation result of the image sample with the hand facing up is the center of the palm of the hand, and an annotation result of the image sample with the hand facing down may be an identifier indicating the back of the hand.

In an example, when the target gesture to be recognized relates to a specific hand pose, the classification type needs to include the specific hand pose, and the gesture classification neural network may be trained with a sample hand image including the specific hand pose, so that the gesture classification neural network can recognize the specific hand pose from the image in the bounding box of hand.

A person skilled in the art should understand that it may also be determined that the hand pose in the bounding box conforms to the hand pose in the target gesture in other ways, gesture detection is performed by using the hand pose in the bounding box, and the like. No limitation is made thereto in the present disclosure.

In the embodiments of the present disclosure, the image in the bounding box is classified with the gesture classification neural network, so as to recognize whether the hand pose in the bounding box is the hand facing up, i.e., the hand pose in which the palm can be seen. In this case, compared with a video classification model, the gesture classification neural network is easier to obtain and annotate a training sample, the recognition speed of the gesture classification neural network model is relatively high, and thus, real-time recognition for the hand pose can be implemented.

In some embodiments, the target hand may be tracked in a video stream according to the target hand in the to-be-processed image in the following way.

For one of image frames in the video stream, a first matrix and a second matrix of the image frame are determined according to a first matrix and a second matrix of a previous image frame immediately next to the image frame, where the first matrix of the image frame includes position information of the center of the bounding box of the target hand in the image frame, and the second matrix of the image frame is a covariance matrix of the first matrix of the image frame and used to measure joint variability of each element in the first matrix of the image frame.

In response to recognizing the target hand from the to-be-processed image, e.g., when the target hand to be tracked is recognized from the to-be-processed image, the target hand to be tracked may be tracked in the video stream captured at a same view or in the video stream captured at different views.

When the target hand to be tracked is tracked in the video stream captured at different views, it is required to first determine the hand associated with the target hand from an image, where the image is one of image frames in the video stream and captured synchronously with the to-be-processed image; the hand associated with the target hand is determined as a to-be-tracked target hand; and then the to-be-tracked target hand is tracked in the video stream.

How to track the target hand to be tracked in the video stream is described below by taking the to-be-processed image and the video stream captured at the same view as an example.

For each image frame in the video stream captured subsequent to capture of the to-be-processed image, a first matrix and a second matrix of the image frame are predicted according to a first matrix and a second matrix of a previous image frame immediately next to the image frame. Initial information of a first matrix X and a second matrix P may be determined according to the hand detection result of the to-be-processed image. The first matrix X includes position information of the center of the bounding box of the target hand in the image frame, for example, the first matrix X may be 1*2 matrix; the second matrix P is a covariance matrix for measuring joint variability of each element, for example, position variable in the first matrix X, where the second matrix P may be an artificially set hyperparameter matrix, for example, a 2*2 matrix.

For any image frame in the video stream, in a case of different hand detection results, the first matrix and the second matrix of the image frame may be determined in different ways.

In response to the hand detection result of the image frame not including the bounding box of the target hand, it is assumed that the target hand is in a stationary state, the first matrix of the previous image frame immediately next to the image frame is determined as the first matrix X of the image frame, i.e., the first matrix X of the image frame is the same as the first matrix of the previous image frame; for the second matrix P of the image frame, the second matrix of the previous image frame is corrected with a correction matrix Q to obtain the second matrix of the image frame, i.e., the second matrix of the image frame is a sum of the second matrix of the previous image frame and the correction matrix Q, where the correction matrix Q is a covariance matrix of the second matrix of the previous image frame and used to measure joint variability of each element in the second matrix of the previous image frame. The correction matrix Q may also be an artificially set hyperparameter matrix and has the same size as the second matrix of the previous image frame. In a case that the second matrix of the previous image frame is a 2*2 matrix, the correction matrix Q is also a 2*2 matrix.

In response to the hand detection result of the image frame including the bounding box of the target hand, a result of prediction according to the previous image frame is corrected according to the hand detection result of the image frame to obtain the first matrix X and the second matrix P of the image frame.

First, a first prediction matrix and a second prediction matrix of the image frame may be predicted with the first matrix of the previous image frame according to a time interval between the image frame and the previous image frame. For example, it may be assumed that the target hand moves uniformly and linearly in a set direction, and on the basis that the first matrix including the position information of the previous image frame is known, the first prediction matrix of the image frame may be determined according to the time interval between the image frame and the previous image frame. The second prediction matrix is a covariance matrix of the first prediction matrix. The first prediction matrix of the image frame includes first predicted position information of the center of the bounding box of the target hand in the image frame. The first predicted position information is calculated based on the first matrix of the previous image frame and the time interval between the image frame and the previous image frame.

Next, a third prediction matrix of the image frame may be obtained according to the position information of the bounding box of the target hand, and a fourth prediction matrix that is a covariance matrix of the third prediction matrix is obtained. The third prediction matrix includes second predicted position information of the center of the bounding box of the target hand in the image frame. In an example, it is assumed that the bounding box of the target hand is a rectangle, the positions of four edges of the rectangle in the image frame are determined and then the second predicted information is determined based on the positions of four edges of the rectangle. The fourth prediction matrix is used to measure joint variability of each element in the third prediction matrix and may also be an artificially set hyperparameter matrix.

Finally, in response to determining that the fourth prediction matrix obeys a first Gaussian distribution and the second prediction matrix obeys a second Gaussian distribution, a new Gaussian distribution may be obtained by multiplying the first Gaussian distribution by the second Gaussian distribution; the first matrix X of the image frame may be obtained according to an average value of the new Gaussian distribution; and the second matrix P of the image frame may be obtained according to covariance of the new Gaussian distribution. In this way, the first matrix X including the position information in the image frame may be obtained, so as to implement tracking of the target hand in the video stream.

In the embodiments of the present disclosure, the position information of the target hand in the current image frame is obtained with the first matrix including the position information of the target hand and the second matrix, e.g., covariance matrix of the previous image frame, and thus, the tracking of the target hand in the video stream can be implemented accurately and effectively.

The target tracking method provided by the embodiments of the present disclosure is described below by taking the target gesture to be recognized being two hands both facing up and the two hands being respectively located above two specific sub-areas on a tabletop as an example. A person skilled in the art should understand that the target tracking method is not limited to tracking the target hand making the target gesture above, and may also be used for tracking the target hand making other target gestures.

Figure 2:
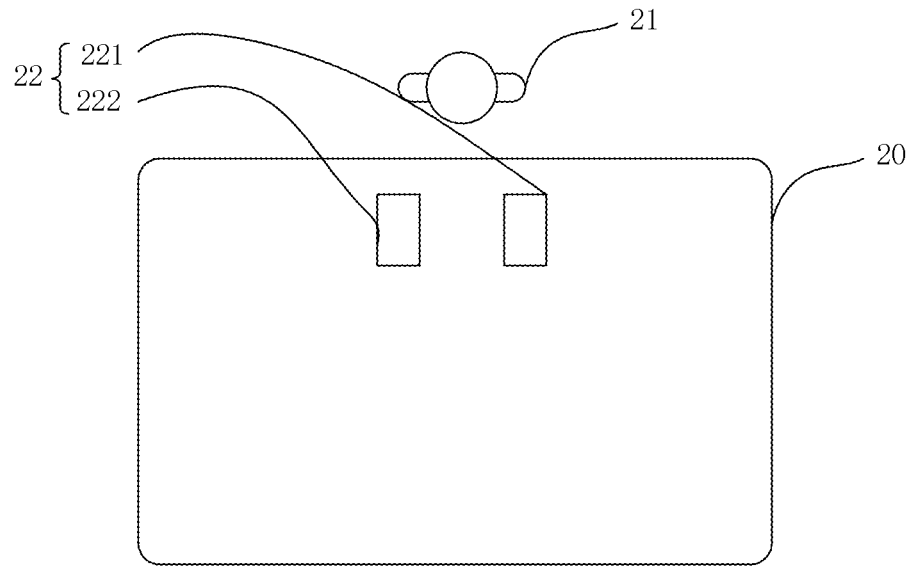
FIG. 2 is a schematic diagram of an application scene of a target tracking method provided by at least one embodiment of the present disclosure.

FIG. 2 is a schematic diagram of an application scene of a target tracking method provided by at least one embodiment of the present disclosure. As shown in FIG. 2, the target gesture to be recognized is the gesture with two palms facing up made above two areas 221 and 222 of a tabletop 20.

First, a to-be-processed image including all or some of areas of the tabletop 20 captured at an overhead view is detected so as to obtain a hand detection result.

If a hand is detected, i.e., the hand detection result includes a bounding box, an image in the bounding box is input to a gesture classification neural network to obtain a hand gesture classification result. The gesture classification neural network is used for classifying the input image into the hand facing up or the hand with other poses, and an obtained hand gesture classification result includes the hand facing up or the hand with the other poses. If classification results of two bounding boxes are hands facing up, it is determined that hand poses in the bounding boxes are both the hands facing up and conform to hand poses in the target gesture.

If it is determined that the two hands both face up, it is determined whether the positions of the two bounding boxes are located in two set sub-areas of the to-be-processed image. The two set sub-areas of the to-be-processed image are determined according to the position and intrinsic parameters of the image capture device for capturing the to-be-processed image, and are, for example, the positions of two areas 221 and 222 on the tabletop 20. In response to center points of the two bounding boxes are respectively located in the two set sub-areas, it is determined that the hands make the target gesture.

In an example, an image cropped according to the bounding box of hand may be input into the gesture classification neural network to obtain a hand gesture classification result. If the to-be-processed image includes multiple bounding boxes of hand, multiple cropped images are respectively input into the gesture classification neural network.

The above gesture classification neural network for classifying the input image into a hand facing up or the hand with other poses may be trained in the following way.

First, an image sample including a hand facing up is obtained, and a center of the palm of the hand in the image sample is annotated.

Figure 3A:
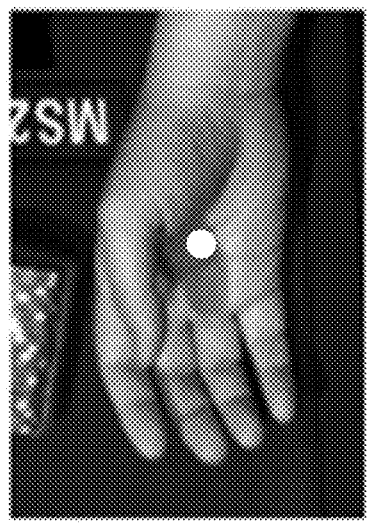
FIGS. 3A-3F are schematic diagrams of a hand gesture classification result provided by at least one embodiment of the present disclosure.
Figure 3B:
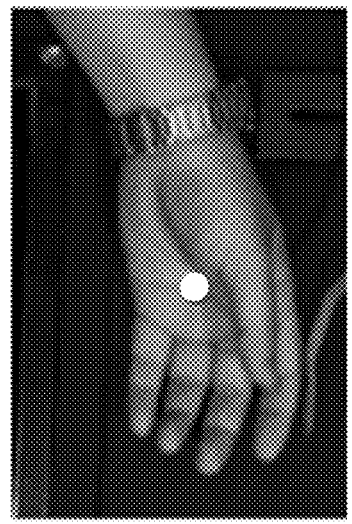

FIGS. 3A and 3B are exemplary image samples with hands facing up. The hand image in which the palm facing up is seen may be taken as an image sample with the hand facing up, and an annotation result of the image sample of the hand facing up is the center of the palm of the hand. White points in the palms in FIGS. 3A and 3B are annotations of the image samples with the hands facing up. FIGS. 3C-3F are exemplary hand images with other poses, for example, a hand image with a hand facing down or a palm being blocked, and the hand images may be annotated with identifiers of other poses. The palm being blocked refers to the palm facing up but a center of the palm is blocked.

The gesture classification neural network is trained with the image sample above, and the trained neural network can classify the image in the bounding box to obtain a classification result including the hand facing up or the hand with other poses.

Figure 3C:
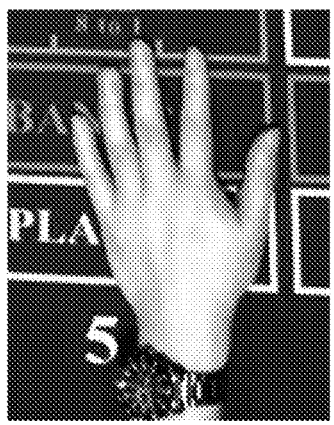
Figure 3D:
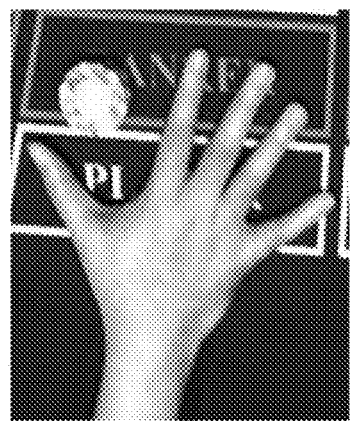
Figure 3E:
Figure 3F:
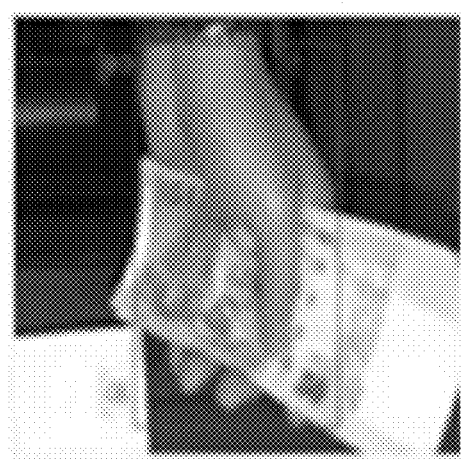

In some embodiments, the gesture classification neural network may classify the image in the bounding box into the hand facing up, or the hand facing down, or the hand with other poses. The gesture classification neural network may be trained by obtaining image samples with the hand facing up, the hand facing down, and the hand with other poses. FIGS. 3A-3F are still taken as examples. FIGS. 3A and 3B are exemplary image samples with hands facing up, and annotation results of the image samples with the hands facing up are the centers of the palms of the hands. FIGS. 3C and 3D are exemplary image samples with hands facing down. The hand image with a complete hand back and five fingers may be taken as a back sample hand image, and the hand image is annotated with an identifier of a back of the hand. FIGS. 3E and 3F are exemplary image samples with hands with other poses. The hand image in which a center of a palm, a complete hand back, or five fingers are not seen may be taken as an image sample with the hand with other poses, and the hand image is annotated with identifiers of other poses. In FIGS. 3E and 3F, centers of palms cannot be seen, and therefore, the poses are other poses. The gesture classification neural network is trained with the image samples above, and the trained neural network can classify the image in the bounding box into the hand facing up, the hand facing down, or the hand with other poses.

In the embodiments of the present disclosure, the image in the bounding box is classified with the gesture classification neural network, so as to recognize whether the gesture in the bounding box is the palm facing up. In this case, compared with a video classification mode, the gesture classification neural network is easier to obtain and annotate a training sample, the recognition speed of the gesture classification neural network model is relatively high, and thus, real-time recognition for the hand pose can be implemented.

On the basis that the hand gesture classification result conforms to the hand pose in the target gesture, a position constraint is performed on a pre-defined area of the to-be-processed image to further determine that the detected hand makes the target gesture.

In response to that target hands making a gesture with two palms facing up above two areas 221 and 222 of a tabletop 20 is recognized from the to-be-processed image including the tabletop 20, the target hands are tracked from a synchronously captured video stream. For example, position information of each target hand in a current image frame is obtained with a first matrix including the position information of the target hand and a second matrix e.g., covariance matrix of a previous image frame, and thus, the tracking of the target hand in the video stream can be implemented accurately and effectively.

The target tracking method provided by the embodiments of the present disclosure is described by taking the target gesture being a palm-up gesture of a croupier as an example.

Figure 4:
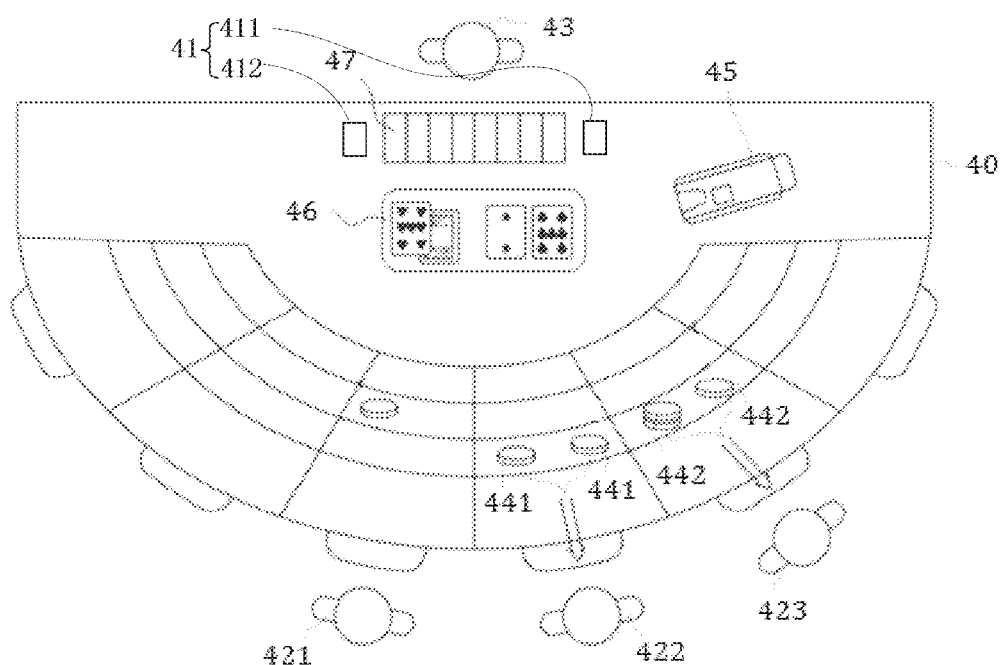
FIG. 4 is a schematic diagram of an application scene of a target tracking method provided by at least one embodiment of the present disclosure.

FIG. 4 is a schematic diagram of an application scene of a target tracking method provided by at least one embodiment of the present disclosure. As shown in FIG. 4, in a game scene, a game may be played by a game table 40, and players 421, 422, 423 and a croupier 43 are located on opposite sides of the game table. The game table includes: an exchanged object area 47 (an area in front of the croupier) of the croupier, exchanged object areas 441 and 442 (areas in front of the players) of the players, a game area 46, and a pre-defined area 41 (which can also be referred to as a hot area).

The palm-up gesture of the croupier indicates that after completing a specific operation or before executing the specific operation, the palms of both hands of the croupier face up and the hands are horizontally placed on the two sides of the exchanged object area of the croupier (as the exchanged object area 47 in FIG. 4) to show others that there is nothing in the hands, indicating that the game can proceed to a next stage.

In the embodiments of the present disclosure, two sub-areas on the two sides of the exchanged object area in front of the croupier on the game table (for example, sub-areas 411 and 412 in FIG. 4) may be taken as a specific area of an actual space. Two corresponding set sub-areas on a to-be-processed image are determined according to the position and intrinsic parameters of a camera for capturing the to-be-processed image, and the position of the specific area, and a position constraint is performed on a hand gesture classification result.

The to-be-processed image including all or some of areas of the game table 40 is detected. If an obtained hand detection result includes a bounding box of hand, an image in the bounding box is input into a pre-trained gesture classification neural network. The gesture classification neural network is capable of classifying the input image into a hand facing up or the hand with other poses. In response to that classification results of images in two bounding boxes are both hands facing up, it is further determined whether two hand detection positions are located in the two set sub-areas in the to-be-processed image. If the two hands are detected to be located in the two set sub-areas respectively, it is indicated that the two hands enter the hot area on the game table 40 respectively, and then it can be determined that the detected hands make the palm-up gesture.

In response to recognizing the target hand making the palm-up gesture from the to-be-processed image including the game table 40, i.e., the hands of the croupier are recognized, the hands of the croupier are tracked from a synchronously captured video stream. For example, position information of the hands of the croupier in a current image frame is obtained with a first matrix including position information of the target hand of a previous image frame and a second matrix, such as covariance matrix, and thus, the tracking of the hands of the croupier in the video stream can be implemented accurately and effectively. By recognizing the hands of the croupier, whether any forbidden objects are carried in the hands of the croupier can be monitored.

Figure 5:
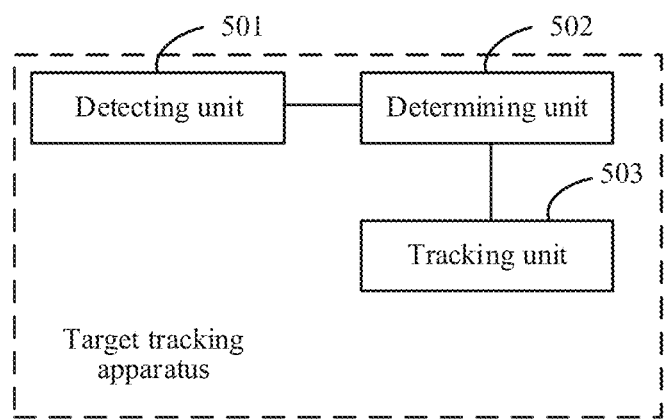
FIG. 5 is a schematic structural diagram of a target tracking apparatus provided by at least one embodiment of the present disclosure.

FIG. 5 is a schematic structural diagram of a target tracking apparatus provided by at least one embodiment of the present disclosure. As shown in FIG. 5, the apparatus includes: a detecting unit 501, configured to detect a to-be-processed image to obtain a hand detection result; a determining unit 502, configured to, in response to the hand detection result including a bounding box, determine a hand in the bounding box with a hand pose conforming to a hand pose in a target gesture as a target hand; and a tracking unit 503, configured to track the target hand in a video stream according to the target hand in the to-be-processed image, where images in the video stream and the to-be-processed image are obtained by capturing a same target area, and the image in the video stream captured after the to-be-processed image is captured.

In some embodiments, the determining unit 502 is configured to: in response to the hand detection result including the bounding box, determining a hand in the bounding box, with the hand pose conforming to the hand pose in the target gesture and in a pre-defined area in the to-be-processed image, as the target hand.

In some embodiments, the determining unit 502 is specifically configured to, in response to the hand detection result including the bounding box, crop an image located in the bounding box in the to-be-processed image; and determine, according to the cropped image, that the hand pose in the cropped image conforms to the hand pose in the target gesture.

In some embodiments, the hand pose in the target gesture is that two hands both face up; the determining unit 502 is configured to: input an image in the bounding box to a gesture classification neural network to obtain a hand gesture classification result, the hand gesture classification result including a hand facing up or the hand with other poses; and if hand gesture classification results of two bounding boxes of hand are that two hands both face up, determine that the hand poses in the bounding boxes of hand conform to the hand pose in the target gesture.

In some embodiments, the gesture classification neural network is obtained by training with hand image samples, hand image samples including an image sample with a hand facing up, and an annotation result of the image sample with the hand facing up being a center of a palm of the hand.

In some embodiments, the determining unit 502 is configured to: in response to determining that a center point of the bounding box is located in the pre-defined area of the to-be-processed image, determine that the hand in the bounding box is located in the pre-defined area of the to-be-processed image.

In some embodiments, the pre-defined area includes two set sub-areas corresponding to two sub-areas in the target area respectively in the to-be-processed image; the determining unit 502 is configured to determine that center points of two bounding boxes of hand in the to-be-processed image are located in the two set sub-areas respectively.

In some embodiments, the tracking unit 503 is configured to: for one of image frames in the video stream, determine a first matrix and a second matrix of the image frame according to a first matrix and a second matrix of a previous image frame immediately next to the image frame, where the first matrix of the image frame includes position information of the center of the bounding box of the target hand in the image frame, and the second matrix of the image frame is a covariance matrix of the first matrix of the image frame.

In some embodiments, the tracking unit 503 is configured to: in response to a hand detection result of the image frame not including the bounding box of the target hand, determine the first matrix of the previous image frame as the first matrix of the image frame, and correct the second matrix of the previous image frame with a correction matrix to obtain the second matrix of the image frame, where the correction matrix is a covariance matrix of the second matrix of the previous image frame.

In some embodiments, the tracking unit 503 is configured to: in response to the hand detection result of the image frame including the bounding box of the target hand, predict a first prediction matrix and a second prediction matrix of the image frame with the first matrix of the previous image frame according to a time interval between the image frame and the previous image frame, where the second prediction matrix is a covariance matrix of the first prediction matrix; obtain a third matrix and a fourth matrix of the image frame according to the position information of the bounding box of the target hand, where the third prediction matrix includes predicted position information of the center of the bounding box of the target hand in the image frame, and the fourth prediction matrix is a covariance matrix of the third prediction matrix; multiply a Gaussian distribution corresponding to the second prediction matrix by a Gaussian distribution corresponding to the fourth prediction matrix to obtain a new Gaussian distribution; determine the first matrix of the image frame according to an average value of the obtained new Gaussian distribution; and determine the second matrix of the image frame according to covariance of the obtained new Gaussian distribution. In some embodiments, the to-be-processed image is an image of the target area captured at an overhead view.

Figure 6:
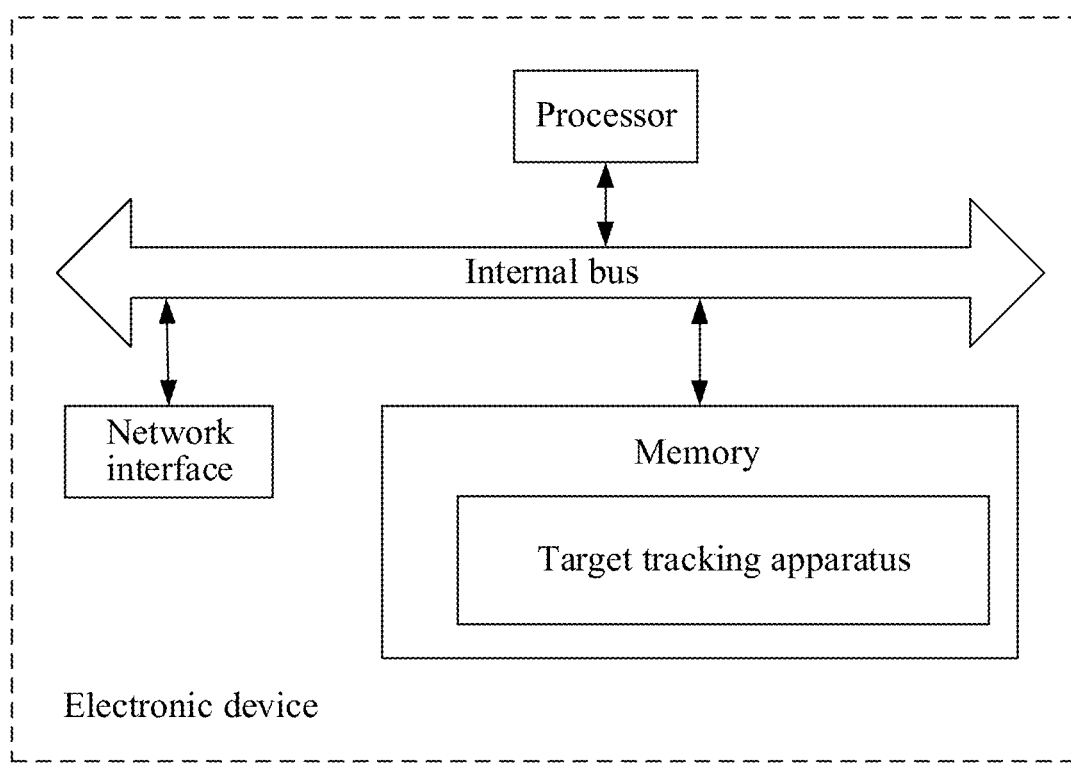
FIG. 6 is a schematic structural diagram of an electronic device according to at least one embodiment of the present disclosure.

FIG. 6 is a schematic structural diagram of an electronic device provided according to at least one embodiment of the present disclosure. The device includes: a processor; and a memory configured to store processor-executable instructions, where the processor is configured to invoke the instructions stored in the memory to execute the target tracking method according to at least one embodiment.

A person skilled in the art should understand that one or more embodiments of the description may provide a method, a system or a computer program product. Therefore, one or more embodiments of the description may take the forms of hardware embodiments, software embodiments, or embodiments in combination with software and hardware. Moreover, one or more embodiments of the description may use the form of the computer program product implemented over one or more computer usable storage media (including but not limited to a disk memory, a CD-ROM, and an optical memory, etc.) that include a computer usable program code.

The embodiments of the description further provide a computer-readable storage medium, having a computer program stored thereon, where the program is executed by a processor, steps of the target tracking method described in any one of embodiments of the present disclosure is implemented.

The embodiments in the description are all described in a progressive manner, for same or similar parts in the embodiments, refer to these embodiments, and each embodiment focuses on a difference from other embodiments. In particular, data processing device embodiments are substantially similar to method embodiments and therefore are only described briefly, and for the associated part, refer to the descriptions of the method embodiments.

The specific embodiments of the description are described above. Other embodiments are within the scope of the appended claims. In some cases, actions or steps described in the claims may be performed in an order different from that in the embodiments and can still achieve a desired result. In addition, the processes described in the accompanying drawings do not necessarily require a specific order shown or a sequential order to achieve the desired result. In some implementations, multi-task processing and parallel processing may also be performed or may be advantageous.

The embodiments of the subject matter and functional operations described in the description may be implemented in digital electronic circuitry, tangible computer software or firmware, computer hardware including the structures disclosed in the description and structural equivalents thereof, or a combination of one or more thereof. The embodiments of the subject matter described in the description may be implemented as one or more computer programs, i.e., one or more modules of computer program instructions encoded on a tangible non-transitory program carrier to be executed by a data processing apparatus or to control operations of the data processing apparatus. Alternatively or additionally, the program instructions may be encoded on artificially generated propagated signals, such as machine-generated electrical, optical or electromagnetic signals, generated to encode and transmit information to a suitable receiver apparatus for execution by the data processing apparatus. The computer storage medium may be a machine-readable storage device, a machine-readable storage substrate, a random or serial access memory device, or a combination of one or more thereof.

The processes and logic flows described in the description can be performed by one or more programmable computers executing one or more computer programs to perform corresponding functions by performing operations according to input data and generating output. The processes and logic flows may also be performed by a special logic circuit, such as a Field Programmable Gate Array (FPGA) or an Application Specific Integrated Circuit (ASIC), and the apparatus may also be implemented as a special logic circuit.

The computer suitable for executing the computer program includes, for example, a general-purpose microprocessor and/or a special-purpose microprocessor, any other type of central processing unit. Generally, the central processing unit receives instructions and data from a read-only memory and/or a random access memory. Basic components of the computer include a central processing unit for implementing or executing instructions and one or more memory devices for storing instructions and data. Generally, the computer further includes one or more large-capacity storage devices for storing data, for example, a magnetic disk, a magneto-optical disk, or an optical disk, or the computer is operably coupled to the large-capacity storage device to receives data therefrom or transmit data thereto, or receive data therefrom and transmit data therefrom. However, the computer does not necessarily include such a device. Furthermore, the computer may be embedded in another device, for example, a mobile phone, a Personal Digital Assistant (PDA), a mobile audio or a video player, a game console, a Global Positioning System (GPS) receiver, or a portable storage device, for example, a Universal Serial Bus (USB) flash drive, just a few examples provided.

A computer-readable medium suitable for storing computer program instructions and data include a non-volatile memory, a medium, and a memory device in all forms, including, for example, a semiconductor memory device (for example, an EPROM, an EEPROM, and a flash device), a magnetic disk (for example, an internal hardware or a movable disk), a magneto-optical disk, and a CD ROM and DVD-ROM disk. The processor and the memory may be supplemented by the special logic circuit or incorporated into the special logic circuit.

Although the description includes many specific implementation details, these should not be interpreted as limiting the scope of any invention or the scope of protection, and are mainly used for describing the features of specific embodiments of a specific invention. Some features described in multiple embodiments in the description may also be implemented in combination in a single embodiment. In addition, various features described in a single embodiment may be separately implemented in multiple embodiments or in any suitable sub-combination. Furthermore, although the features may function in some combinations as described above and even set forth in such a way initially, one or more features from a claimed combination may be removed from the combination in some cases, and the claimed combination may relate to a sub-combination or a modification of the sub-combination.

Similarly, although operations are described in the accompanying drawings in a specific order, this should not be understood as requiring that such operations are performed in the specific order shown or in a sequential order, or that all illustrated operations are performed to achieve a desired result. In some cases, multi-task and parallel processing may be advantageous. Furthermore, the separation of various system modules and components in the embodiments above should not be understood as requiring such separation in all embodiments, and it should be understood that the described program components and systems can generally be integrated together in a single software product or packaged into multiple software products.

Thus, specific embodiments of the subject matter have been described. Other embodiments are within the scope of the appended claims. In some cases, the actions described in the claims can be performed in a different order and still achieve the desired result. In addition, the processes described in the accompanying drawings do not necessarily require a specific order shown or a sequential order to achieve the desired result. In some cases, multi-task and parallel processing may be advantageous.

The above descriptions are only some embodiments of one or more embodiments of the description and are not intended to limit one or more embodiments of the description. Any modifications, equivalent substitutions and improvements made without departing from the spirit and principle of one or more embodiments of the description are intended to be included within the scope of one or more embodiments of the description.

The invention claimed is:

1. A target tracking method, comprising:
   detecting a to-be-processed image to obtain a hand detection result;
   in response to the hand detection result comprising a bounding box of a hand, determining the hand in the bounding box, with a hand pose conforming to a target hand pose in a target gesture and in a pre-defined area in the to-be-processed image, as a target hand; and
   tracking the target hand in a video stream according to the target hand in the to-be-processed image, wherein images in the video stream and the to-be-processed image are obtained by capturing a same target area, the images in the video stream are captured after the to-be-processed image is captured, the target area comprises two sub-areas, the pre-defined area in the to-be-processed image comprises two set sub-areas corresponding to the two sub-areas of the target area respectively, the hand in the bounding box in the pre-defined area refers to that the hand in the bounding box is located in one of the two set sub-areas, and the pre-defined area in the to-be-processed image is determined based on the target area.

2. The method according to claim 1, further comprising:
   in response to the hand detection result comprising the bounding box of a hand, cropping an image located in the bounding box in the to-be-processed image; and
   determining, according to the cropped image, that a hand pose in the cropped image conforms to the target hand pose in the target gesture.

3. The method according to claim 1, wherein the target hand pose in the target gesture is that two hands both face up; and wherein the method further comprises:
   inputting an image in the bounding box to a gesture classification neural network to obtain a hand gesture classification result, the hand gesture classification result comprising a hand facing up or the hand with other poses; and
   if hand gesture classification results of two bounding boxes of a hand in the hand detection result are that two hands in the two bounding boxes both face up, determining that hand poses in the two bounding boxes of a hand conform to the target hand pose in the target gesture.

4. The method according to claim 3, wherein the gesture classification neural network is obtained by training with hand image samples, the hand image samples comprising an image sample with a hand facing up, and an annotation result of the image sample with the hand facing up being a center of a palm of the hand.

5. The method according to claim 1, further comprising:
   in response to determining that a center point of the bounding box is located in the pre-defined area of the to-be-processed image, determining that the hand in the bounding box is located in the pre-defined area of the to-be-processed image.

6. The method according to claim 5, wherein determining that the center point of the bounding box is located in the pre-defined area of the to-be-processed image comprises:
   determining that center points of two bounding boxes of the to-be-processed image are located in the two set sub-areas respectively.

7. The method according to claim 1, wherein tracking the target hand in the video stream according to the target hand in the to-be-processed image comprises:
   for one of image frames in the video stream, determining a first matrix and a second matrix of the image frame according to a first matrix and a second matrix of a previous image frame immediately next to the image frame,
   wherein the first matrix of the image frame comprises position information of the center of the bounding box of the target hand in the image frame, and the second matrix of the image frame is a covariance matrix of the first matrix of the image frame.

8. The method according to claim 7, wherein determining the first matrix and the second matrix of the image frame according to the first matrix and the second matrix of the previous image frame immediately next to the image frame comprises:
   in response to the hand detection result of the image frame not comprising the bounding box of the target hand,
     determining the first matrix of the previous image frame as the first matrix of the image frame, and
     correcting the second matrix of the previous image frame with a correction matrix to obtain the second matrix of the image frame, wherein the correction matrix is a covariance matrix of the second matrix of the previous image frame.

9. The method according to claim 7, wherein determining the first matrix and the second matrix of the image frame according to the first matrix and the second matrix of the previous image frame immediately next to the image frame comprises:
   in response to the hand detection result of the image frame comprising the bounding box of the target hand,
     predicting a first prediction matrix and a second prediction matrix of the image frame with the first matrix of the previous image frame according to a time interval between the image frame and the previous image frame, wherein the second prediction matrix is a covariance matrix of the first prediction matrix;

obtaining a third prediction matrix and a fourth prediction matrix of the image frame according to position information of the bounding box of the target hand, wherein the third prediction matrix comprises predicted position information of the center of the bounding box based on the position information of the bounding box, and the fourth prediction matrix is a covariance matrix of the third prediction matrix;

multiplying a Gaussian distribution corresponding to the second prediction matrix by a Gaussian distribution corresponding to the fourth prediction matrix to obtain a new Gaussian distribution;

determining the first matrix of the image frame according to an average value of the obtained new Gaussian distribution; and determining the second matrix of the image frame according to covariance of the obtained new Gaussian distribution.

10. The method according to claim 1, wherein the to-be-processed image is an image of the target area captured at an overhead view.

11. An electronic device, comprising:
a memory, and
a processor,
wherein the memory is configured to store computer instructions executable on the processor, and when executing the computer instructions, the processor is caused to perform operations including:
detecting a to-be-processed image to obtain a hand detection result;
in response to the hand detection result comprising a bounding box of a hand, determining the hand in the bounding box, with a hand pose conforming to a target hand pose in a target gesture and in a pre-defined area in the to-be-processed image, as a target hand; and
tracking the target hand in a video stream according to the target hand in the to-be-processed image, wherein images in the video stream and the to-be-processed image are obtained by capturing a same target area, the images in the video stream are captured after the to-be-processed image is captured, the target area comprises two sub-areas, the pre-defined area in the to-be-processed image comprises two set sub-areas corresponding to the two sub-areas of the target area respectively, and the hand in the bounding box in the pre-defined area refers to that the hand in the bounding box is located in one of the two set sub-areas, and the pre-defined area in the to-be-processed image is determined based on the target area.

12. The electronic device according to claim 11, wherein the target hand pose in the target gesture is that two hands both face up; wherein the operations further comprise:
inputting an image in the bounding box to a gesture classification neural network to obtain a hand gesture classification result, the hand gesture classification result comprising a hand facing up or the hand with other poses; and
if hand gesture classification results of two bounding boxes of a hand in the hand detection result are that two hands in the two bounding boxes both face up, determining that hand poses in the two bounding boxes of a hand conform to the target hand pose in the target gesture.

13. The electronic device according to claim 11, wherein the operations further comprise:
in response to determining that a center point of the bounding box is located in the pre-defined area of the to-be-processed image, determining that the hand in the bounding box is located in the pre-defined area of the to-be-processed image.

14. The electronic device according to claim 13, wherein determining that the center point of the bounding box is located in the pre-defined area of the to-be-processed image comprises:
determining that center points of two bounding boxes of the to-be-processed image are located in the two set sub-areas respectively.

15. The electronic device according to claim 11, wherein tracking the target hand in the video stream according to the target hand in the to-be-processed image comprises:
for one of image frames in the video stream, determining a first matrix and a second matrix of the image frame according to a first matrix and a second matrix of a previous image frame immediately next to the image frame,
wherein the first matrix of the image frame comprises position information of the center of the bounding box of the target hand in the image frame, and the second matrix of the image frame is a covariance matrix of the first matrix of the image frame.

16. The electronic device according to claim 15, wherein determining the first matrix and the second matrix of the image frame according to the first matrix and the second matrix of the previous image frame immediately next to the image frame comprises:
in response to the hand detection result of the image frame not comprising the bounding box of the target hand,
determining the first matrix of the previous image frame as the first matrix of the image frame, and
correcting the second matrix of the previous image frame with a correction matrix to obtain the second matrix of the image frame, wherein the correction matrix is a covariance matrix of the second matrix of the previous image frame.

17. The electronic device according to claim 15, wherein determining the first matrix and the second matrix of the image frame according to the first matrix and the second matrix of the previous image frame immediately next to the image frame comprises:
in response to the hand detection result of the image frame comprising the bounding box of the target hand,
predicting a first prediction matrix and a second prediction matrix of the image frame with the first matrix of the previous image frame according to a time interval between the image frame and the previous image frame, wherein the second prediction matrix is a covariance matrix of the first prediction matrix;
obtaining a third prediction matrix and a fourth prediction matrix of the image frame according to position information of the bounding box of the target hand, wherein the third prediction matrix comprises predicted position information of the center of the bounding box based on the position information of the bounding box, and the fourth prediction matrix is a covariance matrix of the third prediction matrix;
multiplying a Gaussian distribution corresponding to the second prediction matrix by a Gaussian distribution corresponding to the fourth prediction matrix to obtain a new Gaussian distribution;
determining the first matrix of the image frame according to an average value of the obtained new Gaussian distribution; and determining the second matrix of the image frame according to covariance of the obtained new Gaussian distribution.

18. A non-transitory computer-readable storage medium, having a computer program stored thereon, wherein when the program is executed by a processor, the processor is caused to perform operations including:

detecting a to-be-processed image to obtain a hand detection result;

in response to the hand detection result comprising a bounding box of a hand, determining the hand in the bounding box, with a hand pose conforming to a target hand pose in a target gesture and in a pre-defined area in the to-be-processed image, as a target hand; and tracking the target hand in a video stream according to the target hand in the to-be-processed image, wherein images in the video stream and the to-be-processed image are obtained by capturing a same target area, the images in the video stream are captured after the to-be-processed image is captured, the target area comprises two sub-areas, the pre-defined area in the to-be-processed image comprises two set sub-areas corresponding to the two sub-areas of the target area respectively, the hand in the bounding box in the pre-defined area refers to that the hand in the bounding box is located in one of the two set sub-areas, and the pre-defined area in the to-be-processed image is determined based on the target area.

\* \* \* \* \*